US009272771B2

(12) United States Patent
Baloche et al.

(10) Patent No.: US 9,272,771 B2
(45) Date of Patent: Mar. 1, 2016

(54) SYSTEM FOR ANTICIPATING REQUIRED NAVIGATION PERFORMANCE

(71) Applicant: THALES, Neuilly-sur-Seine (FR)

(72) Inventors: Norbert Baloche, Labstidette (FR); Bertrand Barnetche, Toulouse (FR); Michel Roger, Blagnac (FR)

(73) Assignee: Thales, Courbevoie (FR)

( * ) Notice: Subject to any disclaimer, the term of this patent is extended or adjusted under 35 U.S.C. 154(b) by 187 days.

(21) Appl. No.: 14/075,707

(22) Filed: Nov. 8, 2013

(65) Prior Publication Data

US 2014/0142789 A1    May 22, 2014

(30) Foreign Application Priority Data

Nov. 9, 2012 (FR) ...................... 12 03011

(51) Int. Cl.
*G01C 21/00* (2006.01)
*B64C 19/00* (2006.01)
*G05D 1/10* (2006.01)

(52) U.S. Cl.
CPC ................ *B64C 19/00* (2013.01); *G01C 21/00* (2013.01); *G05D 1/101* (2013.01)

(58) Field of Classification Search
CPC ......... G01C 21/00; G05D 1/101; B64C 19/00
USPC .......................................................... 701/3
See application file for complete search history.

(56) References Cited

U.S. PATENT DOCUMENTS

2008/0140270 A1* 6/2008 Davis et al. ................. 701/8
2009/0112464 A1* 4/2009 Belcher ...................... 701/210

FOREIGN PATENT DOCUMENTS

EP        2009612 A2    12/2008
WO    2005057133 A1     6/2005

* cited by examiner

*Primary Examiner* — John Q Nguyen
*Assistant Examiner* — Anshul Sood
(74) *Attorney, Agent, or Firm* — Baker & Hostetler LLP

(57) ABSTRACT

An onboard flight management system in an aircraft comprises means for continuously calculating first geolocation data, from data received from at least one external geolocation device, comprising a current position and future positions of an aircraft along a trajectory sequenced in several portions and comprising second data comprising demands required by an international navigation procedure called "Required Navigation Performance", or RNP, for all the portions of the trajectory. The management system additionally comprises a means for displaying first and second data all the way along the trajectory, the first and second data being represented graphically and simultaneously on the said display means in order to enable the pilot to anticipate the flight characteristics for the aircraft and make them converge toward the required demands of the next trajectory portion.

8 Claims, 3 Drawing Sheets

SYSTEM FOR ANTICIPATING REQUIRED NAVIGATION PERFORMANCE

CROSS-REFERENCE TO RELATED APPLICATIONS

This application claims priority to foreign French patent application No. FR 1203011, filed on Nov. 9, 2012.

FIELD OF THE INVENTION

The invention is placed in the field of flight management systems and more particularly trajectory calculation means.

BACKGROUND

A Flight Management System, or FMS, is an onboard device on an aircraft. It provides for working out a flight plan on board and its modification in the event, notably, of rerouting. A flight plan is the detailed description of the route to be followed by an aircraft within the framework of a planned flight. It includes notably a chronological sequence of waypoints described by their position, their altitude and their time of overflight. A set of waypoints and the segments connecting them form the reference trajectory to be followed by the aircraft with a view to best adhering to its flight plan. This trajectory is a valuable aid both to the ground control personnel and to the pilot, for anticipating the movements of the aircraft, for example an airplane, and thus ensuring an optimum safety level, notably in the context of the maintaining of inter-aircraft separation criteria.

There are different flight management systems depending on the type of craft and the intended application. However, certain features are common to a majority of flight management systems. Specifically, a flight management system generally comprises a navigation database, a means for recording its flight plan, a performance database for calculating a trajectory and its predictions, guidance means and interfaces on various navigation screens.

FIG. 1 represents a known flight management system 1 comprising:
- databases 100 to construct trajectories and procedures, notably the demands required by the "Required Navigation Performance", or RNP, procedure from data included in the databases such as waypoints, markers, trajectory portions called "legs", defined by several navigation parameters or characteristics such as instructions to follow concerning a position, an altitude or a heading, for example "Navigation database NAV DB" (registered trademark),
- means 101 for entering geographic elements forming the reference trajectory of the route to be followed, for example "Flight plan FPLN" (registered trademark),
- databases 102 containing aerodynamic performance data and aircraft engine data, for example PERF DB, in order to calculate the predictions of altitude, time of passage, fuel consumption along the trajectory,
- means 103 for constructing a continuous trajectory from points on the flight plan which meet the performance characteristics of the aircraft and the confinement constraints (RNP), for example "Lateral trajectory TRAJ" (registered trademark),
- means 104 for constructing an optimized vertical profile on the lateral trajectory, for example "Prediction PRED" (registered trademark),
- means 105 for calculating the geographic position of the aircraft as a function of geolocation means of the GPS (registered trademark) type, Galileo (registered trademark) type, VHF radio beacons type or inertial unit type, for example "Navigation LOCNAV" (registered trademark),
- means 106 for guiding the aircraft in the lateral plane and vertical plane on its 3D trajectory, while optimizing speed, for example "GUID" (registered trademark),
- means 108 for communicating with control centers 112 and other aircraft, "DATALINK", the control centers 112 including, for example, an air traffic control center (ATC), an airline operation center (AOC), and the like.
- a user interface 109 comprising a keypad and at least one screen for entering the required data and displaying the results.

The pilot of the aircraft uses the databases 100 in collaboration with the means 101 for constructing their flight plan and connecting these various waypoints in order to work out the structure of the route to be followed by the aircraft.

The means 103 inserts the structure of the route to be followed, as worked out by the pilot, and combines this with information relating to the aircraft performance characteristics supplied by the databases 100 and 102, thus providing for defining a trajectory which meets the characteristics of the aircraft and the demands required by the RNP procedure. From this trajectory, the means 104 constructs an optimized vertical profile. The means 105 locates the aircraft wherever its position on the terrestrial globe. During the flight, the geolocation data but also the accuracy demands required by international procedures, notably RNP, are transmitted to a means 106 for assisting the pilot or the automatic flight control, enabling the aircraft to be guided on its 4D trajectory. An interface 109 enables the pilot to display this information.

The international procedure called "Required Navigation Performance", or RNP, was first envisaged by the International Civil Aviation Organization, or ICAO, as a means for facilitating changes in airspace. The RNP was created in order that it be possible to specify the conditions to be met as regards airspace and operation, without enduring the constraints of a slow process of equipment and systems specification.

A state in collaboration with industry undertook to update the criteria for using the RNP procedures in order to solve the serious problem of access to airports located in obstacle-rich environments, or during very unfavorable meteorological conditions.

This procedure gives, in addition to the conventional indications, criteria concerning operational aspects to be taken into account for implementing operations in the air: during an engine failure, during an ascent or during a balked landing, for example.

The RNP procedure can bring about considerable advantages from the point of view of operation and safety over other procedures by prescribing an accuracy, an enhanced navigation feature to allow operations using reduced margins for overcoming obstacles which makes the implementation of approach and departure procedures possible in situations where the application of other procedures is not realizable or acceptable from an operational point of view. The RNP procedure provides for taking advantage of lateral and vertical navigation means which improve operational safety and reduce risks of impact without loss of control.

The RNP procedure authorizes, among others, an aircraft to follow a specific trajectory between two points, the trajectory being defined in three dimensions. The RNP procedure prescribes accuracy requirements that the aircraft must adhere to. For example, an RNP requirement 5 indicates that the geolocation means 105 of the aircraft must be capable of calculating the position of the aircraft in a 10 NM wide corridor, where NM means "nautical mile" and 1 nautical mile is equivalent to 1852 m.

During a flight, the geolocation accuracy demand level varies: oceanic airspaces can have an RNP demand of between 4 and 10 NM, at the start of an approach toward an airport, and RNP demands are generally between 1 and 0.5 NM and between 0.3 and 0.1 NM for precision approaches. The increase in the accuracy demand level provides for defining a trajectory in three dimensions composed of straight lines and curves in an environment with high traffic density, around areas sensitive to noise or through a difficult terrain.

The accuracy demand level required can be defined in a configuration file of the flight management system, manually by the pilot or according to the database 100 present in the flight management system. The accuracy level can also be defined by default according to whether the space flown over by the aircraft is of the oceanic type or an airport, for example.

In order to be able to follow the demands of the RNP procedure, the navigation means 105 must be capable of calculating the position of the aircraft with the required accuracy level. The guidance means 106 must also ensure a guidance capability with the same accuracy.

The accuracy level of the guidance is fixed and known for a given aircraft; however, the accuracy level calculated on the position of the aircraft varies during a flight according to whether the aircraft flies over an airport or an oceanic environment.

This is because external satellite navigation devices 111 of the Global Positioning System (GPS) type have different coverage levels depending on the geographic area in question. The same applies for radio navigation means. As regards inertial means, they suffer from the problem of inertial drift inherent to these systems.

It is down to the pilot of the aircraft to ensure that their aircraft is capable of adapting according to the demands required by the RNP procedure.

Presently, the accuracy level required with respect to the current accuracy level is not easily accessible by the pilot. Furthermore, it is known by the pilot only relative to the current position of the airplane, without a true link with the trajectory.

SUMMARY OF THE INVENTION

An aim of the invention is to give the pilot a simple, accurate and easily accessible means for knowing the demands required by the RNP procedure for the current and future trajectory portions.

According to one aspect of the invention, there is proposed an onboard flight management system in an aircraft comprising means for continuously calculating first geolocation data, from data received by at least one external geolocation device, comprising a current position and future positions of an aircraft along a trajectory sequenced in several portions and comprising second data comprising demands required by an international procedure called "Required Navigation Performance", or RNP, for each of the portions of the trajectory. The said management system comprises a means for displaying first and second data all the way along the trajectory, the first and second data being represented graphically and simultaneously on the said display means in order to enable the pilot to anticipate the flight characteristics for the aircraft and make them converge toward the required demands of the next trajectory portion.

The pilot will thus be able to anticipate at the earliest moment changes in the required accuracy level.

The display means, according to one aspect of the invention, is suitable for representing the aircraft trajectory portions by straight-line segments, and a second segment is placed on at least one of the first segments, the second segments being associated with a numeric value corresponding to the value of the geolocation accuracy demand required according to the RNP procedure, at least one of the ends of the first straight-line segments being able to be represented by a mark corresponding to a waypoint of the aircraft.

The display system is suitable for representing at least the trajectory portions between the current position of the aircraft and the position of the aircraft after an anticipation duration, the anticipation duration corresponding to a sufficient time interval, of the order of 20 minutes, for the pilot to have the time to modify the navigation characteristics in order to satisfy the future required geolocation accuracy demand.

The value of the time interval or in other words the anticipation duration is predetermined and is a function of the speed of the airplane, for example, or can be adjusted by the pilot according to the flight characteristics of the aircraft.

According to one embodiment of the invention, the second segments are associated with a color code, the said color code comprising three colors, a first color corresponding to the current accuracy demand required according to the RNP procedure and satisfied, a second color corresponding to future accuracy demands required by the RNP procedure and satisfied, and a third color corresponding to current or future accuracy demands required by the RNP procedure and not satisfied and which will remain so while the navigation performance characteristics are not modified.

The external geolocation devices of the aircraft comprise a "Global Navigation Satellite System", or GNSS.

BRIEF DESCRIPTION OF THE DRAWINGS

The invention will be better understood on studying a few embodiments described by way of examples which are not at all limiting and which are illustrated by accompanying drawings in which.

DETAILED DESCRIPTION

Figure 1:
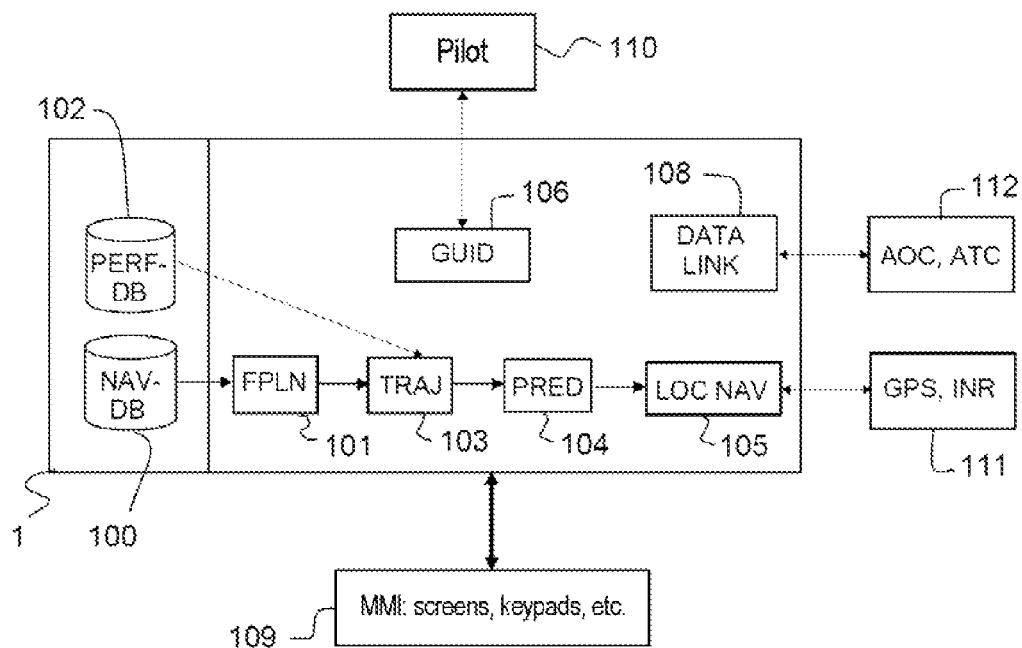
FIG. 1 schematically represents a flight management system according to the prior art.
Figure 2A:
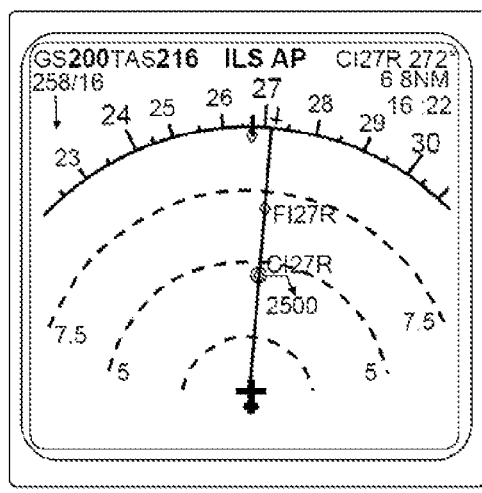
FIGS. 2a, 2b and 2c illustrate different pages of the navigation screen of a flight management system, according to the prior art.
Figure 2B:
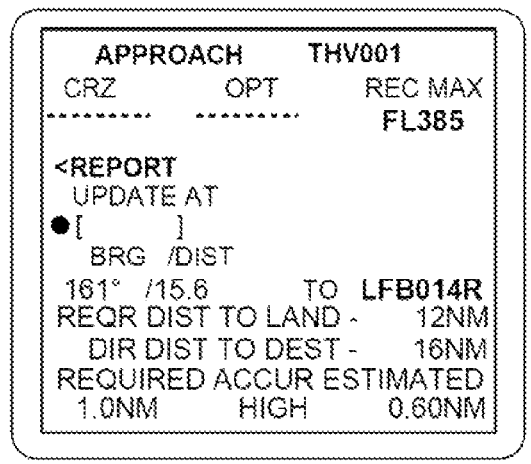
Figure 2C:
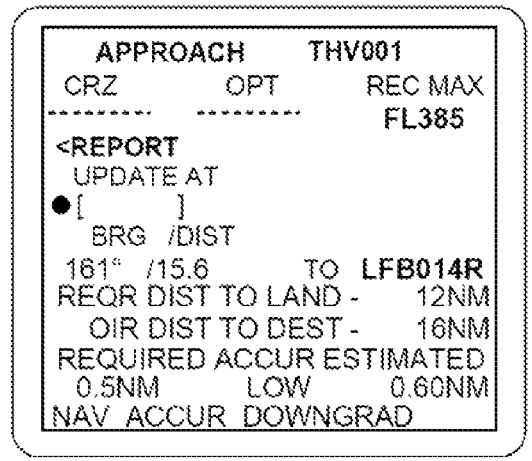

FIGS. 2a, 2b and 2c represent a user interface 109 such as a navigation screen of a flight management system.

FIG. 2a represents a first page of a navigation screen of the flight management system on board an aircraft. This first page indicates the trajectory to be followed by the aircraft. This page is generally easily accessible by the pilot of the aircraft and does not require any maneuver on the part of the pilot to have access to it; this page is accessible by the pilot 110 in the "head-up" position.

The current position of the aircraft is indicated by a symbol in the shape of an aircraft; it is represented at the center of three concentric circles of increasing radius. The trajectory of the aircraft is indicated by an axis passing through the current position of the aircraft, and a first and a second waypoint. The current position and the first waypoint define a first current trajectory portion, a trajectory portion being commonly referred to as a "leg". The first and second waypoints define a second trajectory portion.

FIG. 2b represents a second page of a screen of a flight management system. This second page is not accessible by the pilot in the "head-up" position. Access to this second page requires the pilot to go into the menu of the management system in order to make the page appear on a screen.

The title of the second page is "APPROACH", indicating that the information supplied relates to an approach phase for an airport, for example.

At the bottom left of the second page, the term "REQUIRED" is displayed, and a first numeric value is associated with it. The first numeric value indicates the current accuracy level required by the RNP procedures, and in this particular case this level is 1.0 NM.

At the bottom right of the second page, the term "ESTIMATED" is displayed, and a second numeric value is associated with it. The second numeric value indicates the current accuracy level with which the means 106 locates the aircraft, in this particular case 0.60 NM.

In this particular case, the current accuracy level on the measurement of the location of the aircraft performed by the means 105 is lower than the current accuracy level required by the RNP procedure. The accuracy demand is satisfied. The reliability level is considered to be high, as indicated by the term "HIGH" representing a qualitative indication of the level of integrity of the navigation calculations for the pilot.

FIG. 2c represents a second page of a screen of a flight management system. This is the same page as for FIG. 2b but for the case in which the accuracy demand is no longer satisfied.

At the bottom left of the second page, the term "REQUIRED" is displayed, and a first numeric value is associated with it. The first numeric value indicates the current accuracy level required by the RNP procedures, and in this particular case this level is 0.5 NM.

At the bottom right of the second page, the term "ESTIMATED" is displayed, and a second numeric value is associated with it. The second numeric value indicates the current accuracy level with which the means 106 locates the aircraft, in this particular case 0.60 NM.

In this particular case, the current accuracy level on the measurement of the location of the aircraft performed by the means 106 is greater than the current accuracy level required by the RNP procedure. The accuracy demand is no longer satisfied. The reliability level is considered to be weak, as indicated by the term "LOW" representing a qualitative indication of the level of integrity of the navigation calculations for the pilot.

The management system alerts the pilot. In this particular case, the alert comprises a color indication drawing the attention of the pilot at the bottom of the screen indicating "NAV ACCUR DOWNGRAD".

In this type of management system, the pilot has difficulty in accessing information relating to the accuracy level of the geolocation calculation as well as to the accuracy level required by the RNP procedure. The pilot is also unable to anticipate changes in the required accuracy levels.

Figure 3A:
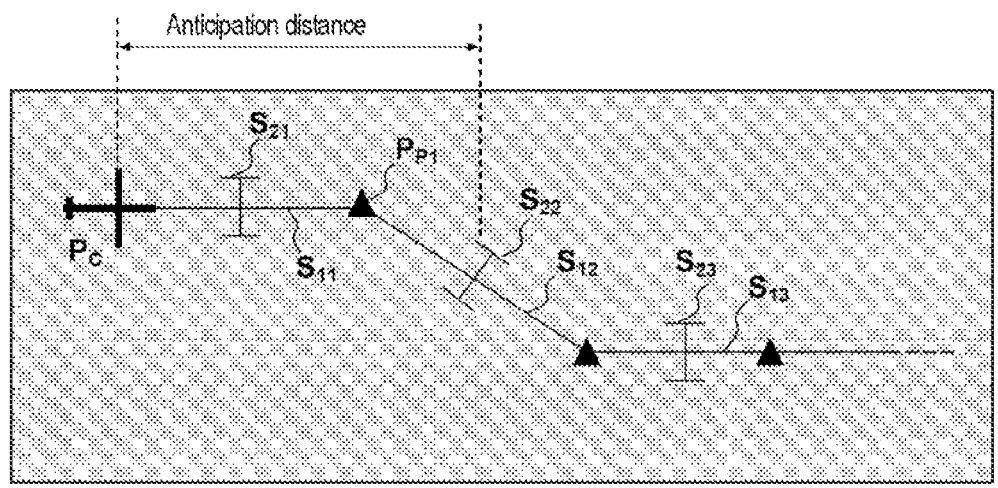
FIGS. 3a and 3b represent a page of a screen of a flight management system, according to one aspect of the invention.

FIG. 3a represents a first example of a page of a screen of the flight management system according to one aspect of the invention. This page can be observed directly by the pilot 110 of an aircraft and does not require particular maneuvers on the flight management system in order to have access to it. In other words, this page is accessible by the pilot 110 of the aircraft in the "head-up" position.

FIG. 3a represents a succession of first segments $S_{1j}$, where j is an index corresponding to the order of the segments. Each of the segments $S_{1j}$ represents a trajectory portion. The first trajectory portion $S_{11}$ is defined by the current position Pc of the aircraft and the first waypoint $P_{p1}$, represented by a solid triangle, as defined in the flight plan. The second trajectory portion $S_{12}$ is defined by the first $P_{p1}$ and second $P_{p2}$ waypoints etc. The first $S_{11}$ and second $S_{12}$ trajectory portions define an intermediate approach zone, and the third trajectory portion $S_{13}$ defines a final approach zone, of an airport for example.

Two segments $S_{2k}$, where k is an index corresponding to the order of the segments in this particular case, positioned on the first segments $S1j$, are associated with a numeric value. The two segments $S_{2k}$ schematically represent a corridor inside which the aircraft can travel. The associated numeric value corresponds to the accuracy demand level required by the RNP procedure.

Thus, in FIG. 3a, the first segment $S_{11}$ comprises a second segment $S_{21}$ associated with the value 1. According to one aspect of the invention, this representation indicates that on the current trajectory portion the position calculation means 105 must locate the aircraft in a corridor of width 2 NM.

Similarly, the accuracy level required according to the RNP procedure is 1 on the second trajectory portion represented by the segment $S_{12}$ and 0.3 on the third trajectory portion represented by the segment $S_{13}$.

In the intermediate approach zone, the accuracy demand required by the RNP procedure on the location of the aircraft is lower than in a final approach zone.

Furthermore, the screen of the flight management system, according to one aspect of the invention, associates a set of three colors with the representation of the trajectory.

In FIG. 3a, the first second segment $S_{21}$ with a digit above it, which represents the accuracy demand according to the RNP procedure for the first current trajectory portion, is of a first color, in this particular case white. This first color indicates that the current demand is satisfied by the calculation means 105 of the management system.

An anticipation distanced corresponds to the product of the anticipation duration Td and the speed of the aircraft. The anticipation distanced is defined as a function of the geographic area flown over. The anticipation distanced corresponds to the time required for the pilot 110 adapt the flight characteristics of the aircraft to the future required accuracy demand. In fact, the anticipation distanced in a final approach zone is generally shorter than in an intermediate approach zone.

The second segment $S_{22}$, representing the accuracy demands for the second trajectory portion, is of a second color, in this particular case green. This second color indicates that the future accuracy demand required by the RNP procedure, i.e. for the second trajectory portion, will be satisfied if the characteristics of the aircraft are not modified.

The third segment $S_{23}$ representing the accuracy demands for the second trajectory portion is green.

The numeric value associated with the segment $S_{23}$ is 0.3. The accuracy level demand on the third trajectory portion is increased with respect to the second trajectory portion and changes to 0.3 NM. In other words, on the third trajectory portion, the calculation means for the position of the aircraft must be to locate the aircraft in a corridor of width 0.6 NM.

The segment $S_{23}$ and the associated numeric value are green indicating that the future accuracy demand required by the RNP procedure for the third trajectory portion will be satisfied if the characteristics of the aircraft are not modified.

Figure 3B:
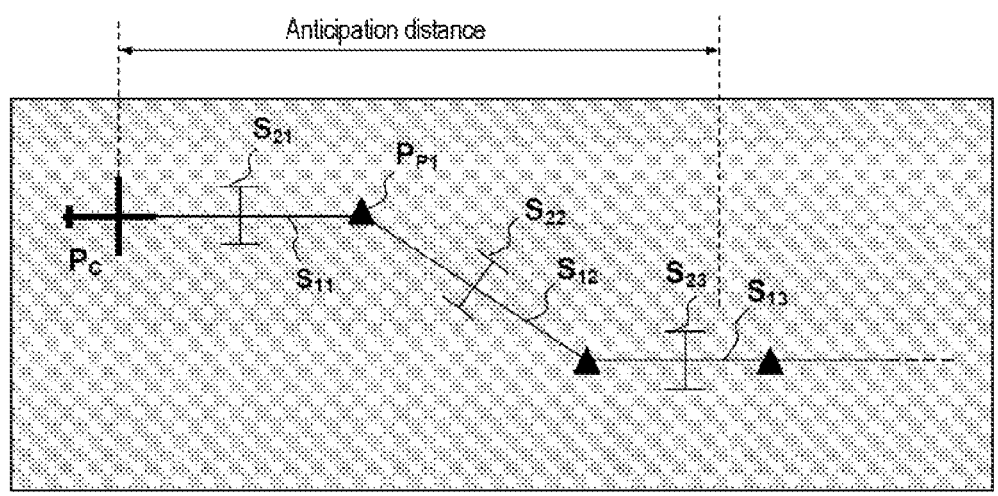

FIG. 3b represents a second example of a page of a screen of a flight management system as FIG. 3a.

In this particular case, the accuracy demand required by the procedure for the third trajectory portion will not be satisfied by the aircraft if the characteristics of the aircraft are not modified.

The pilot can choose whether or not to make the required RNP demands on the trajectory portions appear on the screen.

When the accuracy demand required by the RNP procedure is entered in the management system by the pilot and when the value indicated is lower than the current accuracy level EPU, a message is generated on the navigation screen to warn the pilot about the inconsistency.

The invention claimed is:

1. An onboard flight management system in an aircraft comprising: means for continuously calculating first geolocation data, from data received from at least one external geolocation device, comprising a current position (Pc) and future positions (Pp) of an aircraft along a trajectory sequenced in several portions and comprising second data comprising "Required Navigation Performance" demands, or RNP demands, at least one RNP demand associated with each of the portions of the trajectory including future portions of the trajectory, and further comprising a means for displaying first and second data all the way along the trajectory, the first and second data being represented graphically and simultaneously on the said display means in order to enable a pilot to anticipate flight characteristics for the aircraft and make them converge toward required demands of a next trajectory portion.

2. The flight management system according to claim 1, in which the said display means is suitable for representing aircraft trajectory portions by first straight-line segments ($S_{1j}$), and a second segment ($S_{2k}$) is placed on at least one of the first straight-line segments ($S_{1j}$), the second segments ($S_{2k}$) being associated with a numeric value corresponding to a value of a geolocation accuracy demand required according to the RNP demands.

3. The flight management system according to claim 2, in which at least one of two ends (Pc; $P_P$) of the first straight-line segments ($S_{1j}$) is represented by a mark corresponding to a waypoint of the aircraft.

4. The flight management system according to claim 2, in which the display means is suitable for representing at least trajectory portions between the current position ($P_c$) of the aircraft and the future position of the aircraft ($P_p$) after an anticipation duration (Td), the anticipation duration corresponding to a sufficient time interval for the pilot to have enough time to modify navigation characteristics in order to satisfy a future required geolocation accuracy demand.

5. The flight management system according to claim 4, in which the anticipation duration (Td) is predetermined.

6. The flight management system according to claim 4, in which the anticipation duration (Td) can be adjusted by the pilot according to the flight characteristics of the aircraft.

7. The flight management system according to claim 2, in which the second segments ($S_{2k}$) are associated with a color code, the said color code comprising three colors, a first color corresponding to the current accuracy demand required according to the RNP procedure and satisfied, a second color corresponding to the future accuracy demands required by the RNP procedure and satisfied, and a third color corresponding to the future accuracy demands required by the RNP procedure and not satisfied while the navigation performance characteristics are not modified.

8. The flight management system according to claim 1, in which the external geolocation devices are a Global Navigation Satellite System (GNSS), an inertial unit, or ground-based markers.

* * * * *